(12) United States Patent
Senechal (10) Patent No.: US 6,783,315 B1
(45) Date of Patent: Aug. 31, 2004

(54) PIVOTING HITCH-MOUNTED LOADING PLATFORM FOR MOTOR VEHICLES

(76) Inventor: Robert J Senechal, 7221 Hemlock Rd., Ocala, FL (US) 34472

( * ) Notice: Subject to any disclaimer, the term of this patent is extended or adjusted under 35 U.S.C. 154(b) by 0 days.

(21) Appl. No.: 10/348,530

(22) Filed: Jan. 20, 2003

(51) Int. Cl.$^7$ ................................ B60P 9/00; B60R 9/00
(52) U.S. Cl. ........................ 414/462; 224/509; 224/502; 224/524; 224/526
(58) Field of Search ................................ 414/462, 921, 414/546; 224/488, 42.32, 502, 509, 526, 524

(56) References Cited

U.S. PATENT DOCUMENTS

| | | | | |
|---|---|---|---|---|
| 3,103,290 A | * | 9/1963 | Perri | 414/462 |
| 3,724,694 A | * | 4/1973 | Wilson | 414/462 |
| 4,705,448 A | * | 11/1987 | Mungons | 414/462 |
| 4,934,894 A | * | 6/1990 | White | 414/462 |
| 5,011,361 A | * | 4/1991 | Peterson | 414/462 |
| 5,018,651 A | * | 5/1991 | Hull et al. | 224/502 |
| 5,122,024 A | * | 6/1992 | Stokes | 414/462 |
| 5,199,842 A | * | 4/1993 | Watt et al. | 414/537 |
| 5,253,973 A | * | 10/1993 | Fretwell | 414/558 |
| 5,427,289 A | * | 6/1995 | Ostor | 224/499 |
| 5,462,398 A | * | 10/1995 | Hymer | 414/462 |
| 5,586,702 A | * | 12/1996 | Sadler | 224/521 |
| 5,676,292 A | * | 10/1997 | Miller | 224/524 |
| 5,853,278 A | * | 12/1998 | Frantz | 414/462 |
| 5,938,395 A | * | 8/1999 | Dumont, Jr. | 414/462 |
| 6,099,035 A | * | 8/2000 | Garvin, III | 280/769 |
| 6,164,895 A | * | 12/2000 | Croswell | 414/462 |
| 6,345,693 B1 | * | 2/2002 | Yeo et al. | 187/211 |
| 6,345,749 B1 | * | 2/2002 | Hamilton | 224/509 |
| 6,379,101 B1 | * | 4/2002 | Breaux | 414/537 |
| 6,513,690 B1 | * | 2/2003 | Churchill et al. | 224/498 |

* cited by examiner

Primary Examiner—Douglas Hess
(74) Attorney, Agent, or Firm—Michael I. Kroll (57) ABSTRACT

The present invention 10 discloses a loading platform 14 for motor vehicles 12 that is pivotably supported by a rigid stationary frame member 32 with a central square tube 34 that connects with a conventional trailer hitch 36. The platform 14 may be locked securely to the stationary frame member 32 and released to allow for the pivoting movement thereof. A pair of bearing assemblies 42 allow for the axial rotation of the bearing blocks 46 and associated platform 14 around the bearings 44 that remain in a fixed position due to the square tube 34 extending therethrough. Pneumatic pistons 30 communicate between a central portion of the stationary frame member 32 and a distal portion of the platform 14 to provide stability and regulate the rotational movement of the platform 14.

9 Claims, 10 Drawing Sheets

PIVOTING HITCH-MOUNTED LOADING PLATFORM FOR MOTOR VEHICLES

BACKGROUND OF THE INVENTION

1. Field of the Invention

The present invention relates generally to loading platforms and, more specifically, to a loading platform for vehicles that is pivotably supported by a rigid stationary frame member with a central square tube that connects with a conventional trailer hitch. The platform may be locked securely to the stationary frame member and released to allow for the pivoting movement thereof. A pair of bearing assemblies allow for the axial rotation of the bearing blocks and associated platform around the bearings that remain in a fixed position due to the square tube extending therethrough. Pneumatic pistons communicate between a central portion of the stationary frame member and a distal portion of the platform to provide resistance and regulate the rotational movement of the platform.

2. Description of the Art

Numerous vehicle-loading platforms are known in the art. While these vehicle loading devices may be suitable for the particular purpose to which they address, they would not be as suitable for the purpose of the present invention as heretofore described.

SUMMARY OF THE PRESENT INVENTION

The present invention discloses a loading platform for motor vehicles that is pivotably supported by a rigid stationary frame member with a central square tube that connects with a conventional trailer hitch. The platform may be locked securely to the stationary frame member and released to allow for the pivoting movement thereof. A pair of bearing assemblies allow for the axial rotation of the bearing blocks and associated platform around the bearings that remain in a fixed position due to the square tube extending therethrough. Pneumatic pistons communicate between a central portion of the stationary frame member and a distal portion of the platform to provide stability and regulate the rotational movement of the platform.

A primary object of the present invention is to provide a loading platform for motor vehicles that may be installed on any motor vehicle equipped with a standard hitch.

Another object of the present invention is to provide a hitch-mounted loading platform for motor vehicles that pivots on a central fulcrum defined by a square tube telescopically connected with the trailer hitch and extending therefrom across the width of the platform.

Still another object of the present invention is to provide a pivoting, hitch-mounted loading platform for motor vehicles having a horizontal rigid frame member, preferably of a substantially u-shaped configuration, welded perpendicularly to said square tube.

Yet another object of the present invention is to provide a pivoting, hitch-mounted loading platform for motor vehicles employing a dual pneumatic piston system to prevent the platform from freely rotating without the external urging thereof thereby providing a safe and smooth lift.

Still another object of the present invention is to provide a pivoting, hitch-mounted loading platform for motor vehicles having a means for locking the pivoting platform to the stationary frame member.

One other object of the present invention is to provide a pivoting, hitch-mounted loading platform for motor vehicles having recessed tail lights for enhanced safety.

Still yet another object of the present invention is to provide a pivoting, hitch-mounted loading platform for motor vehicles wherein the loading platform may be custom built according to user's needs although the preferable available platform space is 32"×62".

Yet another object of the present invention is to provide a pivoting, hitch-mounted loading platform for motor vehicles that requires no electric motors or mechanical equipment.

Another object of the present invention is to provide a pivoting, hitch-mounted loading platform for motor vehicles constructed of aircraft quality aluminum that will never fade or rust.

One other object of the present invention is to provide a pivoting, hitch-mounted loading platform for motor vehicles with one touch operation that provides the same ease and usability as other electric or hydraulic lift mechanisms without the risk of mechanical failure or messy oil leaks.

Another object of the present invention is to provide a pivoting, hitch-mounted loading platform for motor vehicles that is simple and easy to use.

Yet another object of the present invention is to provide a pivoting, hitch-mounted loading platform for motor vehicles that is inexpensive to manufacture to and operate.

Additional objects of the present invention will appear as the description proceeds.

The present invention overcomes the shortcomings of the prior art by providing a pivoting, hitch-mounted loading platform for motor vehicles that pivots into position for rolling heavy bulky objects such as wheelchairs, rototillers, ATV's and other such objects thereon using gravity, a fulcrum and a frame stop to position the load thereon rather than using mechanical lifts and the like.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.
10 present invention
12 vehicle
14 platform
16 power cord
18 taillights
20 ramp
22 tie-down recesses
24 locking mechanism
26 latch
28 clip
30 piston
32 stationary frame
34 square tube
36 trailer hitch
38 hitch pin
40 track
42 bearing assembly
44 bearing
46 bearing block
48 electrical wire
50 throughbore
52 bolt holes
54 side wall
56 bearing retaining flange

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments since practitioners skilled in the art will recognize numerous other embodiments as well. For a definition of the complete scope of the invention, the reader is directed to the appended claims.

Figure 1:
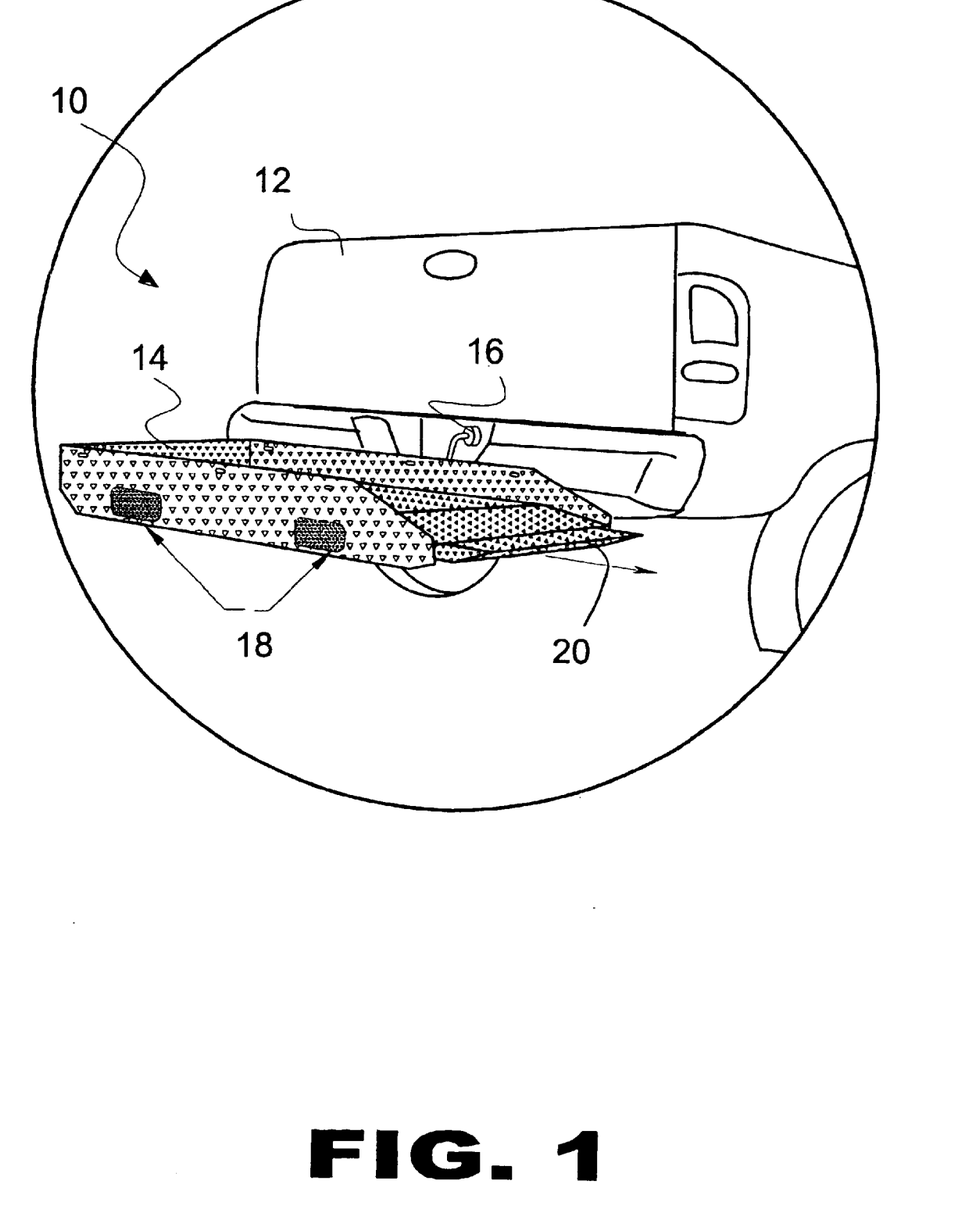
FIG. 1 is an illustrative view of the present invention in use.

Turning to FIG. 1, shown therein is an illustrative view of the present invention 10 installed on the rear end of a truck 12. The present invention 10 is a loading system with a pivoting platform 14 that is easily mounted on the trailer hitch of a motor vehicle 12 for transporting wheelchairs and handicap equipment, scooters, ATV's, lawnmowers and other miscellaneous heavy items. A power cord 16 receives electricity from the vehicle 12 to energize the multiple taillights 18 accordingly. Also shown is a retracted pullout ramp 20 on one end or side of the platform 14.

Figure 2:
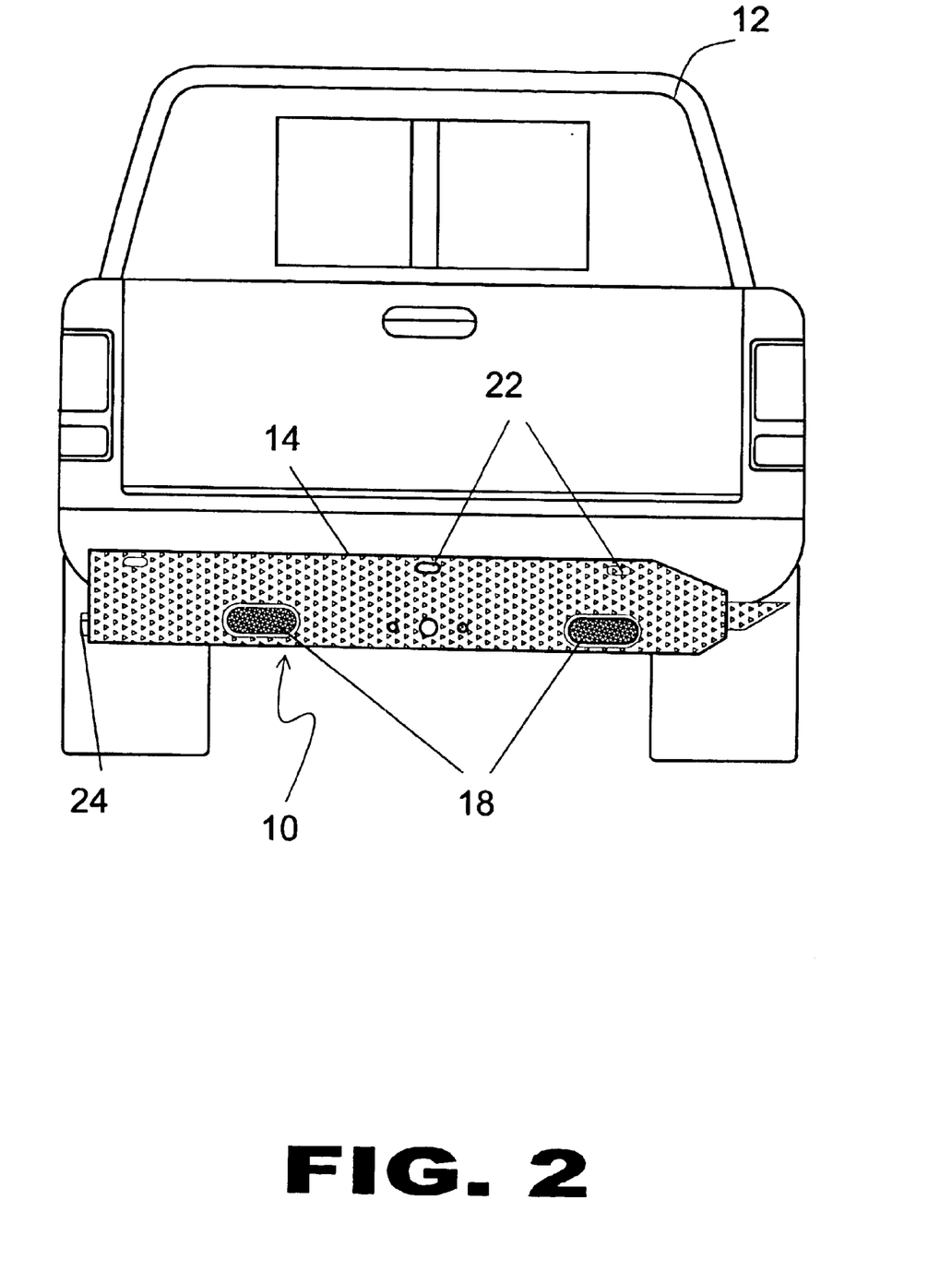
FIG. 2 is front view of the present invention in use.

Turning to FIG. 2, shown therein is front view of the present invention 10 in use. The present invention 10 is shown mounted on a pick-up truck 12 with the loading platform 14 secured in the substantially horizontal travel position. Also shown are multiple tie down recesses 22, locking mechanism 24 and taillights 18.

Figure 3:
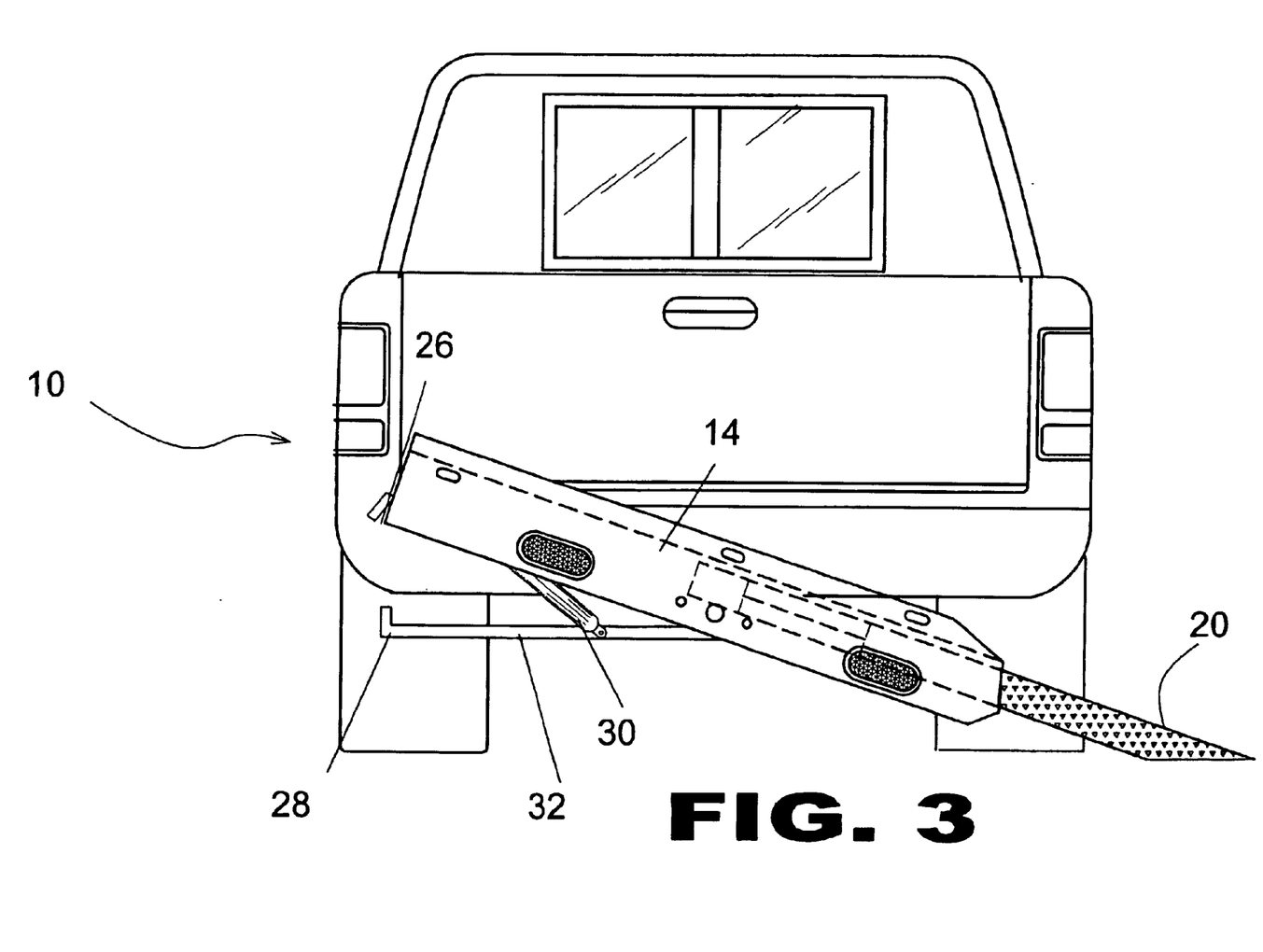
FIG. 3 is front view of the present invention in use.

Turning to FIG. 3, shown therein is front view of the present invention 10 in use. The latch element 26 of the locking mechanism has been released from the clip element 28 thereof on the end of the stationary frame 32 and manual pressure has been applied to the ramp 20 end of the platform 14 to pivot it into position to wheel a load thereon. Two pneumatic pistons 30 provide resistance and stability for a safe and smooth lift of the loading platform 14.

Figure 4:
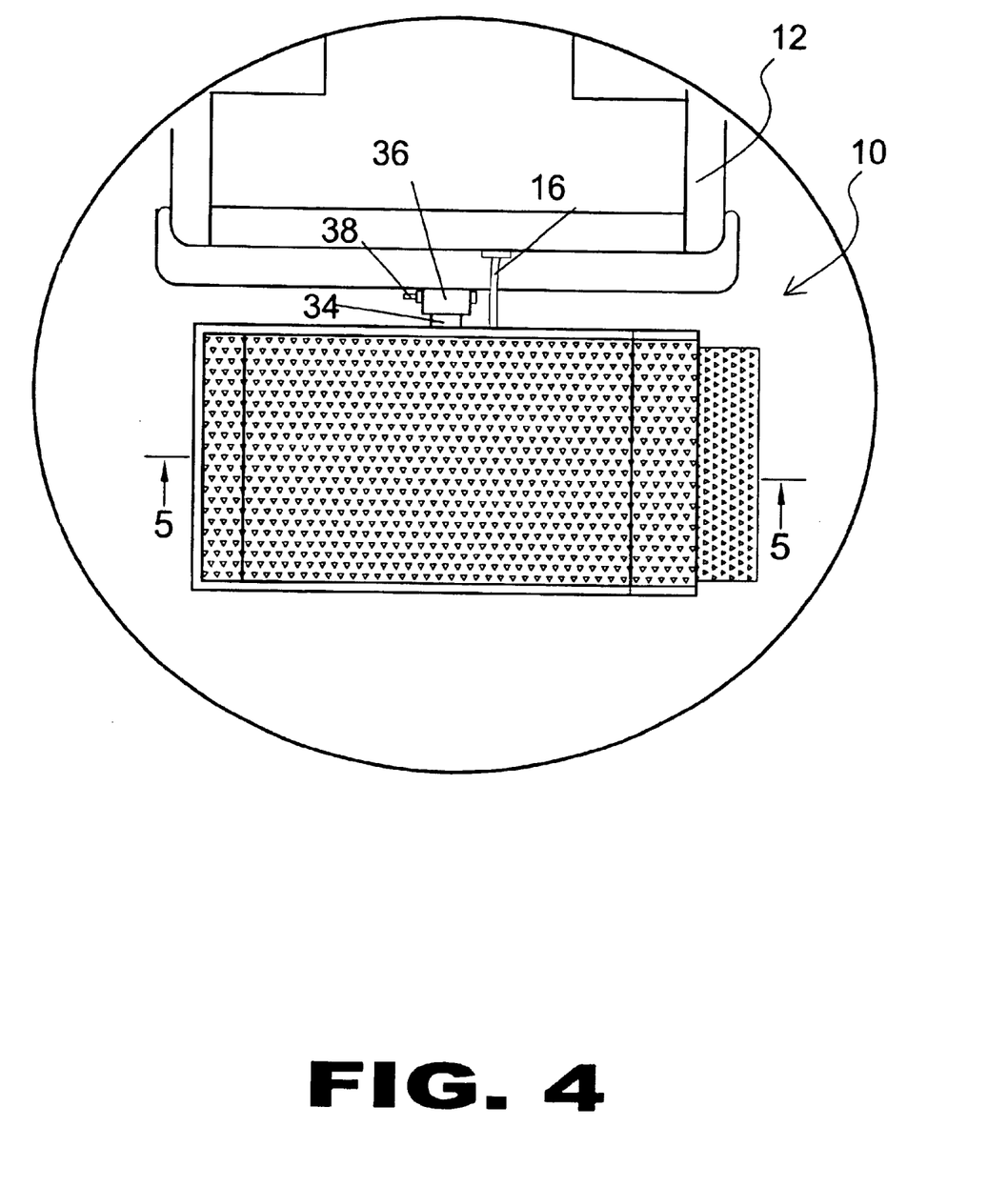
FIG. 4 is a top view of the present invention in use.

Turning to FIG. 4, shown therein is a top view of the present invention 10. The present invention 10 is mounted to the vehicle 12 by inserting the square tube 34 of the platforms stationary frame into a conventional trailer hitch 36 and securing the connection with a typical hitch pin 38. The present invention 10 meets all dot standards for class 2 and class 3 hitches. Also shown is power cord 16.

Figure 5:
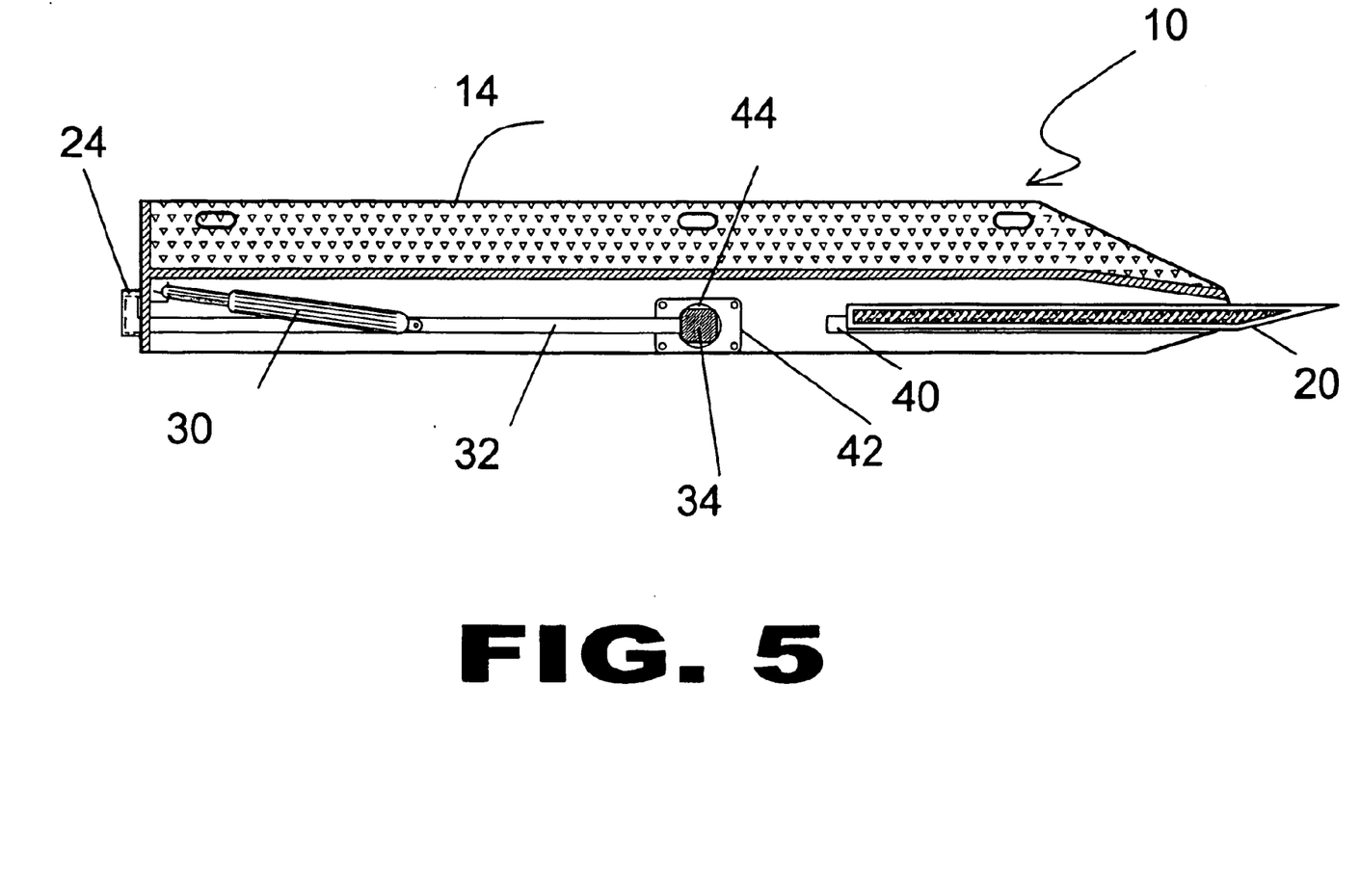
FIG. 5 is a cross sectional front view of the present invention.

Turning to FIG. 5, shown therein is a cross sectional front view of the present invention 10. The locking mechanism 24 is engaged thereby securing the end of the platform 14 to the stationary frame element 32 precluding any inadvertent movement thereof. One end of each of a pair of pistons 30 is fastened to the stationary frame 32 and the other end is secured to the end of the platform 14 thereby creating resistance and stability to the movement thereof thereby hindering rapid, uncontrolled pivoting of the platform 14. The extension ramp 20 rides or slides in a track 40 and when extended the extension ramp 20 reduces the angle of inclination of the device 10 necessary to load an article thereon. Also shown is square tube 34, and bearing assembly 42 with bearing 44.

Figure 6:
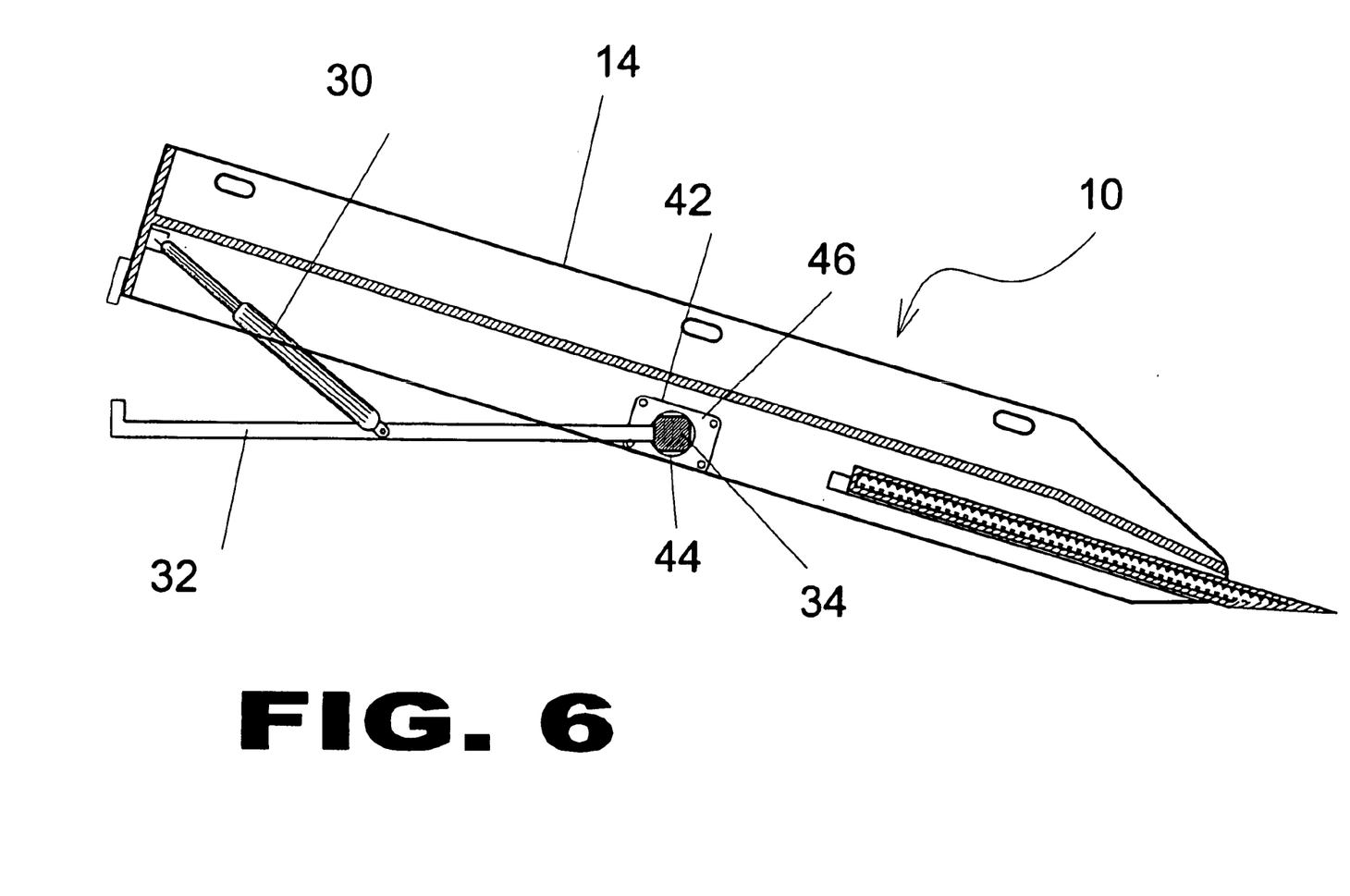
FIG. 6 is a cross sectional front view of the present invention.

Turning to FIG. 6, shown therein is a cross sectional front view of the present invention 10. The bearing blocks 46 are bolted to the side plates of the platform 14 and the bearings 44 rotate in throughbores in bearing assembly 42 located therein. Each bearing 44 has a substantially square throughbore for the square tube 34 to reside therein. This arrangement allows for the axial rotation of the bearing blocks 46 and the attached loading platform 14 about the square tube 34 while the square tube 34 and associated stationary frame 32 assembly remain in a fixed position. Also shown is piston 30 attached to the frame 32 and platform 14.

Figure 7:
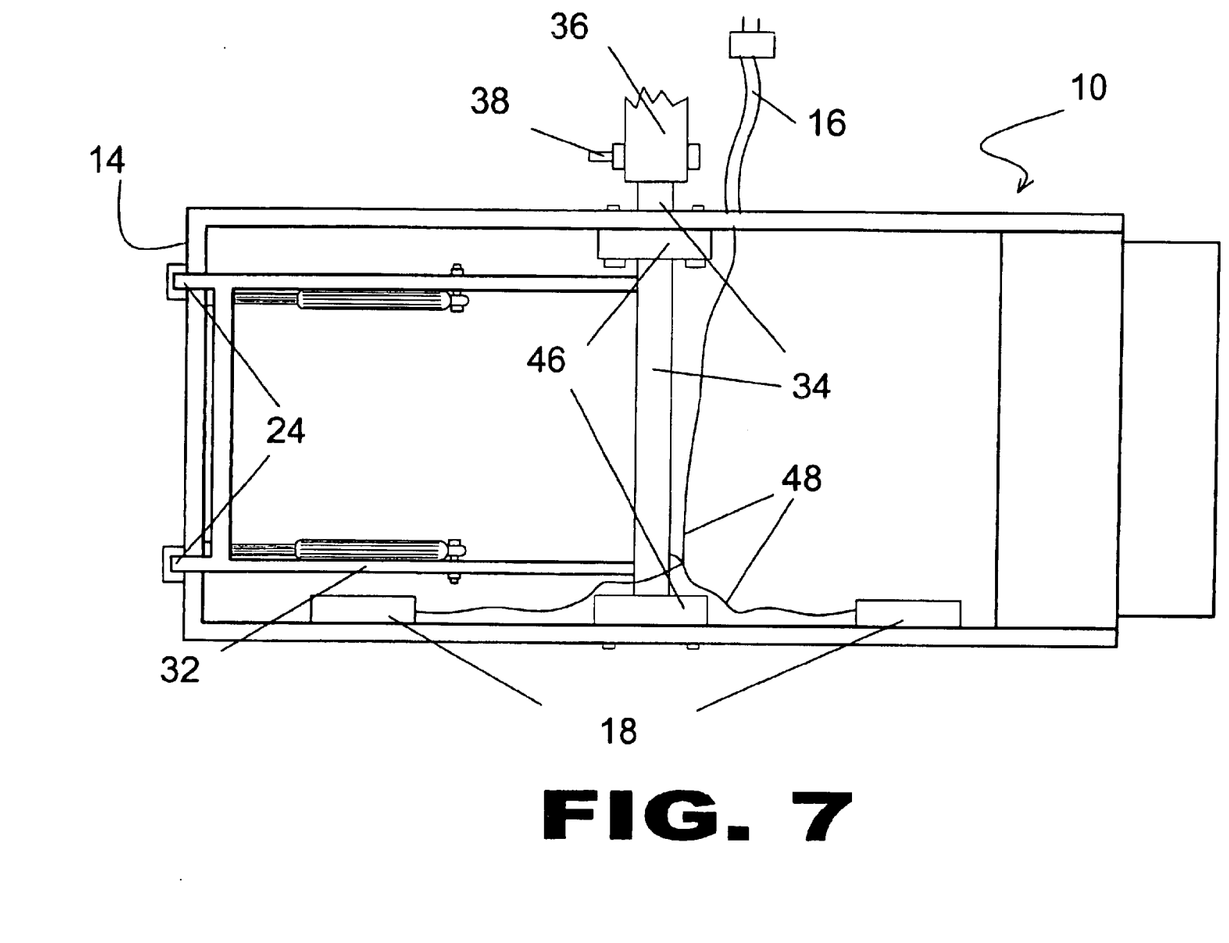
FIG. 7 is a bottom view of the present invention.

Turning to FIG. 7, shown therein is a bottom view of the present invention 10. Shown is the square tube 34 inserted into and secured to the trailer hitch 36 with hitch pin 38 and extending through the first bearing block 46 and terminating at the second bearing block 46. The stationary frame 32 is welded to the square tube 34 and one end of each piston 30 is attached thereto while the other end of each piston is fastened to the end wall of the platform 14. Electrical wires 48 communicate between the taillights 18 and the power cord 16 which plugs into a mating socket on the vehicle. Also shown is the locking mechanism 24.

Figure 8:
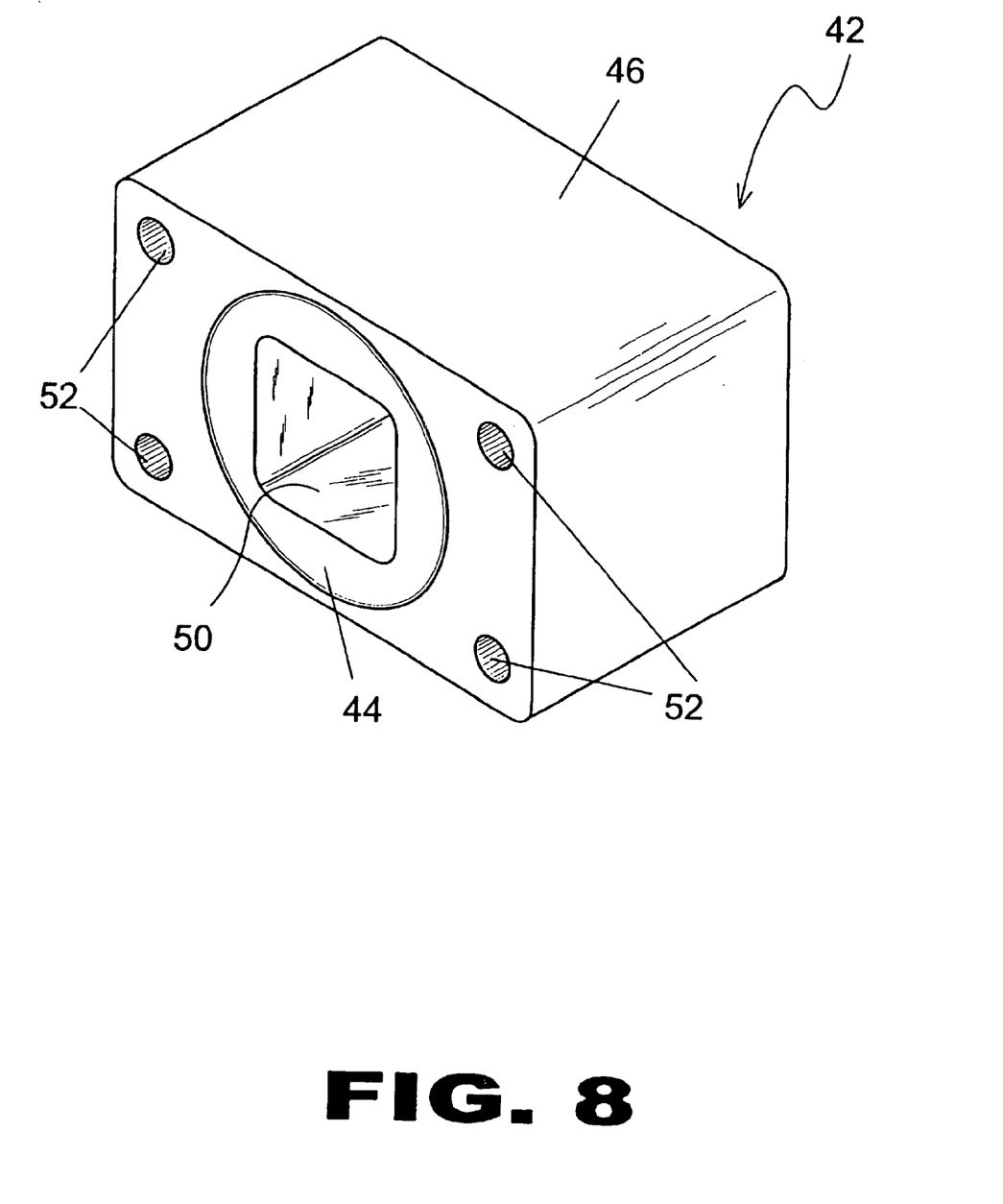
FIG. 8 is a perspective view of the bearing assembly.

Turning to FIG. 8, shown therein is a perspective view of the bearing assembly 42 showing the bearing 44 inserted within the bearing block 46. The plastic bearing 44 rotates freely within the block 46. Also shown is a throughbore 50 for the square tube and multiple bolt holes 52.

Figure 9:
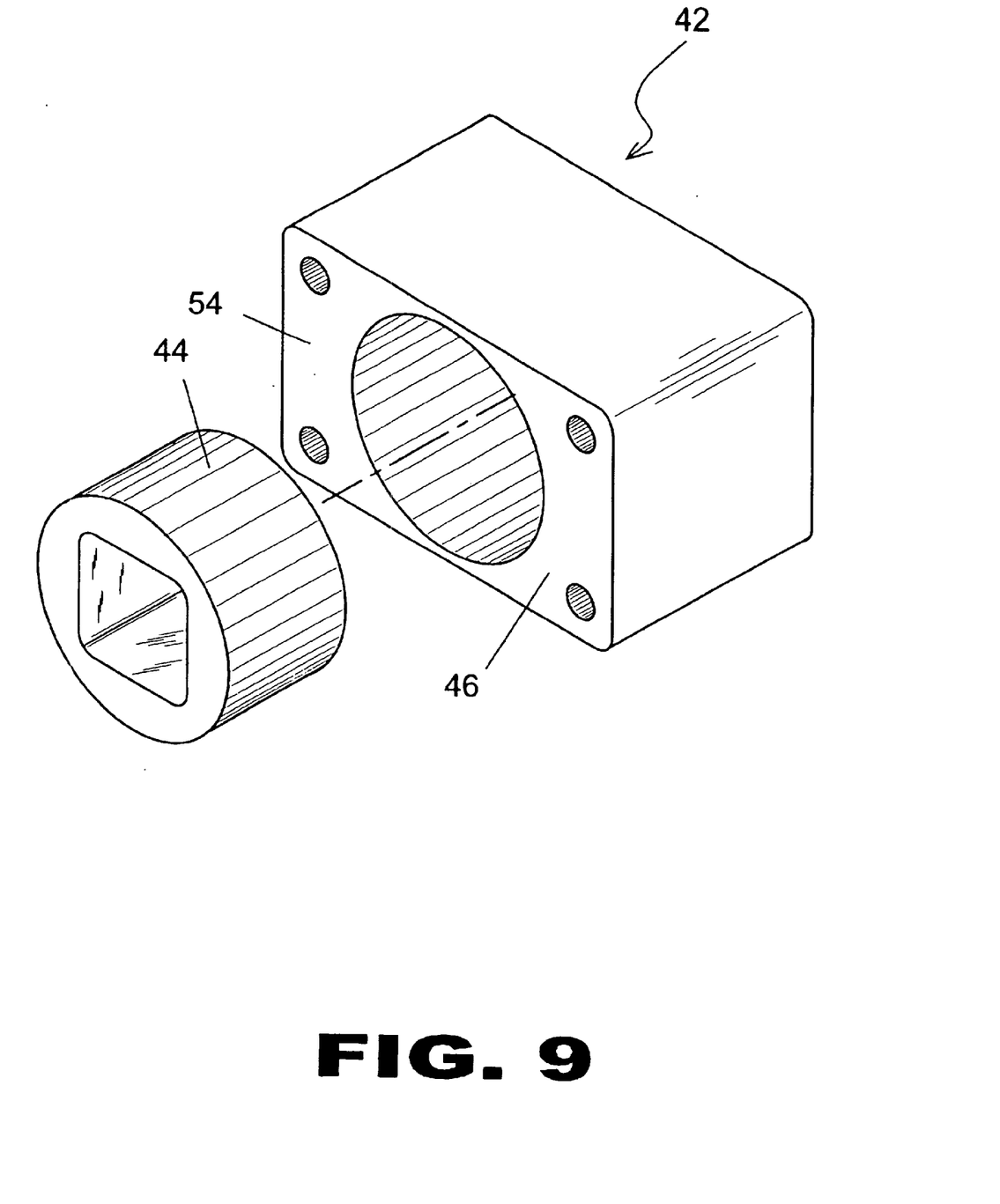
FIG. 9 is an exploded perspective view of the bearing assembly.

Turning to FIG. 9, shown therein is an exploded perspective view of the bearing assembly 42. Shown are the bearing block 46, bearing 44, and the side wall 54 of the bearing block 46.

Figure 10:
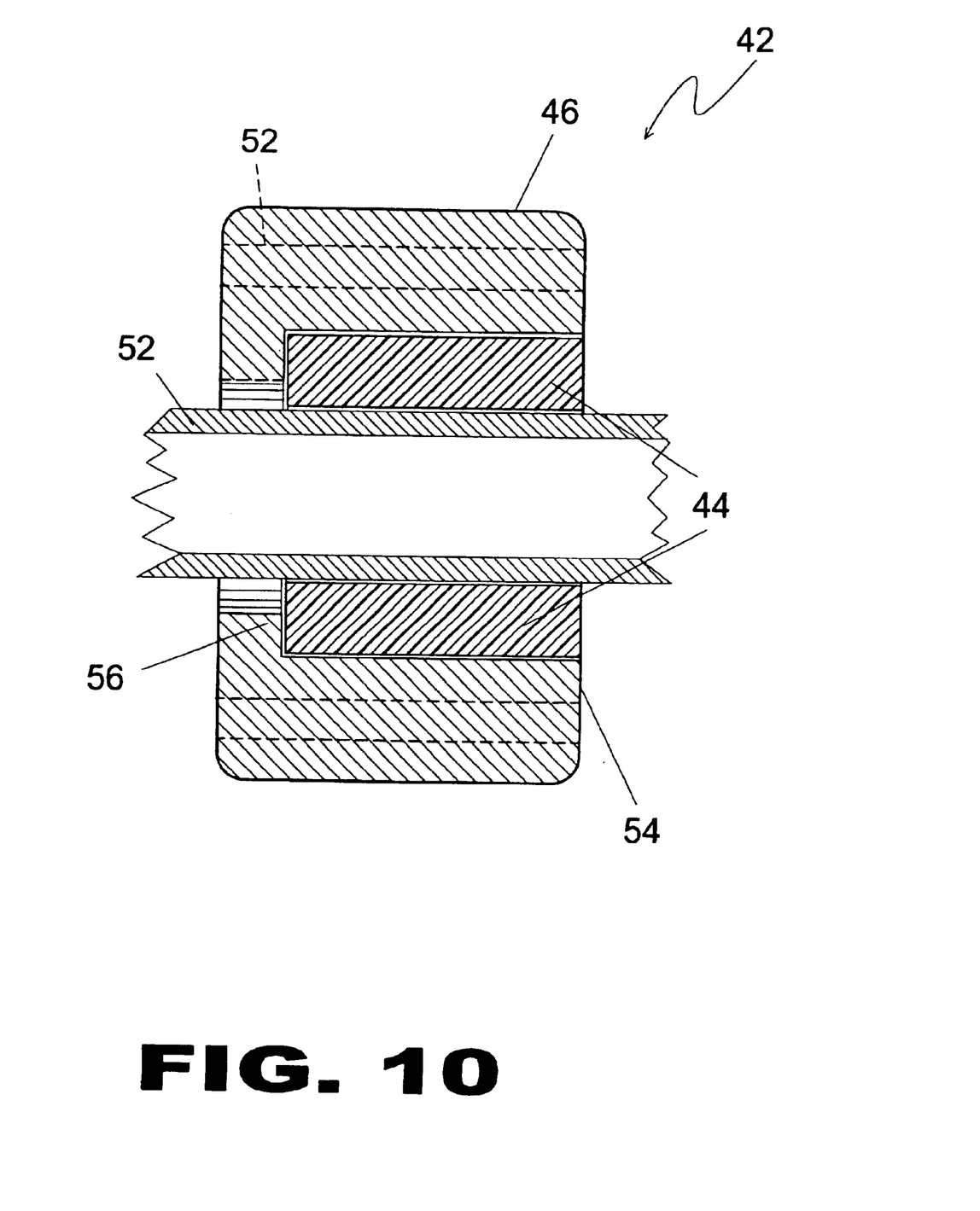
FIG. 10 is a sectional view of the bearing assembly.

Turning 10, shown therein is a sectional view of the bearing assembly 42 showing the bearing block 46 with the bearing 44 inserted therein and the square tube 34 passing therethrough. The bearing 44 retaining flange 56 is of a lesser diameter than that of the bearing 44 cavity thereby containing the bearing 44 between the retaining flange 56 and the wall 54 when installed. The bolt holes 52 are also shown.

What is claimed to be new and desired to be protected by letters patent is set forth in the appended claims:

I claim:

1. An apparatus for a pivoting loading platform for motor vehicles, the platform being connected to a trailer hitch attached to the rear of the motor vehicle, comprising:
    a) a trailer hitch fixedly attached to said rear end of said vehicle, said hitch having a square receptacle therein a square tube member, wherein said square tube member has a plurality of holes therein for receiving a trailer hitch pin so that said square tube member can be removably fixedly attached to said trailer hitch;

b) a platform, said platform being pivotal, said platform being substantially planar, said platform having a front and a rear end, a first and a second side, a top and a bottom, said platform having a wall disposed an said front, said rear end and said first side of said platform wherein said wall extends beyond said top and bottom of said platform to form a top and bottom wall around the platform wherein said wall can contain articles therein, said top and bottom wall having an inner and outer surface;

c) a ramp disposed on said second side of said platform, wherein said ramp is extendable away from said second side of said platform to make it easier to load articles onto said platform;

d) a pair of bearing assemblies having a square throughbore therein, said first bearing assembly being about intermediately mounted on said inner surface of said front, bottom wall and said second bearing assembly being about intermediately mounted on said inner surface of said rear, bottom wall, wherein said rear bottom wall has an aperture therein, said aperture being aligned with said square throughbore of said second bearing assembly to permit said square tube member to pass therethrough;

e) wherein said square tube member has a first end and a second end wherein said first end of said square tube member has said plurality of holes therein for receiving said trailer hitch pin for connection to said trailer hitch, wherein said second end of said square tube member is disposed in said square throughbore of said first bearing assembly and said first end of said square tube member passes through said square throughbore in said second bearing assembly disposed on said rear, bottom wall to permit the square tube member and platform to pivot about the pair of bearing assemblies;

f) a stationary frame having a pair of spaced apart, parallel members extending laterally from said square tube member to said inner surface of said first side of said bottom wall, wherein said stationary frame has at least one cross member for providing support to said pair of parallel frame members, each of said parallel frame members having a first and second end, wherein each of said first ends of said parallel members are fixedly connected to said square tube member and each of said second ends of said parallel members are removably fixedly connected to said outer surface of said first side of said bottom wall; and, g) a latch mechanism disposed on each of said second ends of said parallel members; said latch mechanism providing removable fixed connection to said outer surface of said first side of said bottom wall so that the platform can pivot when the latch mechanism does not connect the frame and wall of the platform.

2. The apparatus of claim 1, further comprising a pair of shock absorbers each having a first and second end, side first end of each said shock absorbers is connected to one of said pair of said parallel members intermediate said first and second end of said parallel members and said second end of each said shock absorber is connected to said inner surface of said first side of said bottom wall to provide stability to the platform as the platform is pivoted.

3. The apparatus of claim 2, wherein said shock absorber is a pneumatic shock absorber.

4. The apparatus of claim 3, wherein edges of said ramp slide in a pair of tracks, wherein a first track is disposed on said inner surface of said front bottom wall and a second is disposed on said inner surface of said rear bottom wall, said ramp having a top surface and a bottom surface.

5. The apparatus of claim 4, wherein said top surface of said ramp is substantially coincident with said top of said platform as said ramp extends from said second side of said platform to permit articles to be easily loaded onto the platform.

6. The apparatus of claim 5, wherein said ramp extends substantially from said front and to said rear end of said platform to permit articles to be easily loaded onto the platform.

7. The apparatus of claim 6, wherein each of said pair of bearing assemblies comprises:

a) a bearing block being generally rectangular having a front face and a rear face, said bearing block having a plurality of holes therein, said holes extending from said front face to said rear face for receiving a corresponding bolt for attachment of said bearing block to said wall of said platform, said bearing block having a first and second aperture therein, said first aperture extending from said front face of said bearing block partially across said bearing block to a point adjacent to said rear face of said bearing block wherein a flange is formed between said first aperture and said rear face wherein a bearing is inserted into said first aperture, said bearing being complimentarily sized as said first aperture, said bearing having a square throughbore therein for receiving said square tube member, said second aperture being disposed in said rear face of said bearing block to allow said square tube member to pass therethrough;

b) wherein said front face of each of said bearing blocks are attached contiguous to said inner surface of said bottom wall so that said bearing is captured between said wall of said platform and said flange in said bearing block; and, c) a plurality of bolts for attaching said bearing block to said wall of said platform corresponding to said holes in said bearing block.

8. The apparatus of claim 7, further comprising an electrical power cord disposed on said rear of said vehicle, wherein at least one taillight disposed on said front end of said platform is connected by electrical wire to said power cord to permit said taillight to operate.

9. The apparatus of claim 8, wherein said top of said wall has a plurality of recesses therein, said recesses for receiving tie-downs which may be used to secure an article to the platform.

* * * * *